(12) United States Patent
Villada Castillo et al.

(10) Patent No.: US 9,109,116 B2
(45) Date of Patent: Aug. 18, 2015

(54) BIODEGRADABLE PACKAGING OBTAINED FROM CASSAVA FLOUR AND FIQUE FIBER AND THEIR MANUFACTURE PROCESS

(71) Applicants: UNIVERSIDAD DEL CAUCA, Popayan (CO); CENTRO REGIONAL DE PRODUCTIVIDAD E INNOVACION DEL CAUCA CREPIC, Popayan (CO)

(72) Inventors: Hector Samuel Villada Castillo, Popayan (CO); Diana Paola Navia Porras, Cali (CO); Juan Pablo Castaneda Nino, Pereira (CO)

(73) Assignee: UNIVERSIDAD DEL CAUCA, Popayan (CO)

( * ) Notice: Subject to any disclaimer, the term of this patent is extended or adjusted under 35 U.S.C. 154(b) by 19 days.

(21) Appl. No.: 14/346,417

(22) PCT Filed: Sep. 23, 2012

(86) PCT No.: PCT/IB2012/055060
§ 371 (c)(1),
(2) Date: Mar. 21, 2014

(87) PCT Pub. No.: WO2013/042094
PCT Pub. Date: Mar. 28, 2013

(65) Prior Publication Data
US 2014/0230690 A1 Aug. 21, 2014

(30) Foreign Application Priority Data
Sep. 23, 2011 (CO) .................. 2011124719

(51) Int. Cl.
| | |
|---|---|
| C08L 97/02 | (2006.01) |
| C08J 3/20 | (2006.01) |
| C08L 99/00 | (2006.01) |
| B29D 7/01 | (2006.01) |
| B29C 47/78 | (2006.01) |
| C08J 5/18 | (2006.01) |
| C08J 3/18 | (2006.01) |
| C08J 3/24 | (2006.01) |
| B29C 47/00 | (2006.01) |
| B29C 47/80 | (2006.01) |
| C08L 3/02 | (2006.01) |
| B29K 67/00 | (2006.01) |

(52) U.S. Cl.
CPC ............. *C08L 99/00* (2013.01); *B29C 47/0004* (2013.01); *B29C 47/78* (2013.01); *B29C 47/807* (2013.01); *B29D 7/01* (2013.01); *C08J 3/18* (2013.01); *C08J 3/20* (2013.01); *C08J 3/246* (2013.01); *C08J 5/18* (2013.01); *C08L 3/02* (2013.01); *C08L 97/02* (2013.01); *B29C 47/0021* (2013.01); *B29K 2003/00* (2013.01); *B29K 2067/046* (2013.01); *B29K 2995/006* (2013.01); *B29K 2995/0056* (2013.01); *C08J 2303/02* (2013.01); *C08J 2367/04* (2013.01); *C08J 2397/02* (2013.01); *C08J 2399/00* (2013.01); *C08J 2467/04* (2013.01); *C08J 2497/02* (2013.01)

(58) Field of Classification Search
CPC ................ C08J 3/18; C08J 3/246; C08J 3/20; C08J 2303/02; C08J 2397/02; C08J 2497/02; C08L 3/02; C08L 97/02
See application file for complete search history.

(56) References Cited

U.S. PATENT DOCUMENTS

| | | | |
|---|---|---|---|
| 5,922,379 A | 7/1999 | Wang | |
| 5,939,192 A | 8/1999 | Rettenbacher et al. | |
| 6,168,857 B1 | 1/2001 | Andersen et al. | |
| 7,067,651 B2 | 6/2006 | Poovarodom et al. | |
| 2007/0276317 A1 | 11/2007 | Henderson et al. | |

FOREIGN PATENT DOCUMENTS

| | | |
|---|---|---|
| CN | 1749317 | 3/2006 |
| EP | 1580237 | 9/2005 |
| KR | 20060115648 | 9/2006 |
| RU | 2136367 | 9/1999 |
| RU | 2341090 | 12/2008 |

OTHER PUBLICATIONS

Luna et al, "Yucca Starch thermoplastic fiber reinforced Fique: Preliminary", Dyna rev.fac.nac.minas. vol. 17 No. 159 Medellin (Dec. 2009).*
Acosta, et al. "Operation Variables Effect of a Simple Use Extrusor on the Thermoplastic Starch Mechanical Properties Done of Cassava Bitter Starch." Facultad De Ciencias Agropecuarias, vol. 2, No. 1, Mar. 2004.
Acosta, et al. "Surface Morphology of Sour Cassava and Natvie Potato Thermoplastic Starches by Optical and Atomic Force Microscopy." Informacion Tecnologica, vol. 17, No. 3, 2006, p. 63-70.
Averous, et al. "Association Between Plasticized Starch and Polyesters: Processing and Performances of Injected Biodegradable Systems." Polymer Engineering and Science, May 2001, vol. 41, No. 5.
Averous, et al. "Biocomposites Based on Plasticized Starch: Thermal and Mechanical Behaviours." Carbohydrate Polymers 56 (2004) 111-122.
Averous, et al. "Plasticized Starch-Cellulose Interactions in Polysaccharide Composites." Polymer 42 (2001) 6565-6572.
Van Der Zee, "Biodegradability of Polymers—Mechanisms and Evaulation Methods." Handbook of Biodegradable Polymers, Chapter 1, 2005.
Muller, "Biodegradation Behaviour of Polymers in Liquid Environments." Handbook of Biodegradable Polymers, Chapter 2, 2005.
Degli Innocentri, "Biodegradation Behaviour of Polymers in the Soil." Handbook of Biodegradable Polymers, Chapter 3, 2005.
Tapia-Blacido, et al. "Development and Characterization of Biogilms Based on Amaranth Flour (*Amaranthus caudatus*)" Journal of Food Engineering 67 (2005) 215-223.

(Continued)

*Primary Examiner* — David M Brunsman
(74) *Attorney, Agent, or Firm* — Maryellen Feehery Hank; Reed Smith LLP

(57) ABSTRACT

The invention points to a process for the production of a compound biodegradable semi-rigid material from cassava flour and fique fiber. The invention divulges a compound material comprising cassava flour, fique fiber, glycerin, vegetable oil, polysorbate 80, and water.

2 Claims, 1 Drawing Sheet

(56) References Cited

OTHER PUBLICATIONS

De Graaf, et al. "Material Properties and Glass Transition Temperatures of Different Thermoplastic Starches After Extrusion Processing." Starch/Starke 55 (2003) 80-86.
Dole, et al. "Gas Transport Properties of Starch Based Films." Carboydrate Polymers 58 (2004) 335-343.
Fama, et al. "Mechanical Properties of Tapioca-Starch Edible Films Containing Sorbates." LWT 38 (2005) 631-639.
Finkenstadt, et al. "A Direct-Current Resistance Technique for Determining Moisture Content in Native Starches and Starch-Based Plasticized Materials." Carboydrate Polymers 55 (2004) 149-154.
Forssell, et al. "Oxygen Permeability of Amylose ADN Amylopectin Films." Carboydrate Polymers 47 (2002) 125-129.
Guan, et al. "Functional Properties of Extruded Foam Composites of Starch Acetate and Corn Cob Fiber." Industrial Crops and Products 19 (2004) 255-269.
Jasson, et al. "Influence of Thickness on the Mechanical Properties for Starch Films." Carbohydrate Polymers 56 (2004) 499.503.
Miura, et al. "Thermal and Viscoelastic Properties of Alginate/Poly(Cinyl Alcohol) Blends Cross-Linked With Calcium Tetraborate." Carbohydrate Polymers 39 (1999) 139-144.
Ma, et al. "The Plastcizers Containing Amide Groups for Thermoplastic Starch." Carbohydrate Polymers 57 (2004) 197-203.
Muratore, et al. "The Influence Fo Using Biodegradable Packaging Films on the Quality Decay Kinetic of Plum Tomato (Pomodorinodatterino)." Journal of Food Engineering 67 (2005) 393-399.
Nashed, et al. "The Plasticisation Effect of Hlycerol and Water on the Gelatinisation of Wheat Starch." Starch/Starke 55 (2003), 131-137.
Parra, et al. "Mechanical Properties and Water Vapor Transmission in Some Blends of Cassava Starch Edible Films." Carbohydrate Polymers 58 (2004) 475-481.
Pedroso, et al. "Mechanical, Thermal and Morphological Characterization of Recycled LDPE/Corn Starch Blends." Carbohydrate Polymers 59 (2005) 1-9.
Peesan, et al. "Preparation ADN Characterization of Hexanoyl Chitosan/Polylactide Blend Films." Carbohydrate Polymers 60 (2005) 343-350.
Petersson, et al. "Water Vapou Permeability and Mechanical Properties of Mixed Starch-Monoglyceride Films and Effect of Filming Forming Conditions." Food Hydrocolloids 19 (2005) 123-132.
Salgado, et al. "Biodegradable Foams Based on Cassava Starch, Sunflower Proteins and Cellulose Fibers Obtained by a Baking Process." Journal of Food Engineering 25 (2008) 435-443.
Shamekh, et al. "Film Formation Properties of Potato Starch Hydrolysates." Starch/Starke 54 (2002) 20-24.
Shogren, et al. "Development of Starch Based Plastics—A Reexamination of Selected Polymer Systems in Historical Perspective." Starch/Starke 45 (1993) NR. 8 , S. 276-280.
Shogren, et al. "Biodegradation of Starch/Polylactic Acid/Poly(Hydroxyester-Ether) Composite Bars in Soil." Polymer Degradation and Stability 79 (2003) 405-411.
Smits, et al. "The Influence of Various Small Plasticisers and Malto-Oligosaccharides on the Retrogradation Fo (Partle) Gelatinisde Starch." Carbohydrate Polymers 51 (2003) 417-424.
Stawski, et al. "Preparation and Characterisation of (Meth)Acryloyloxystarch." Autex Research Journal, vol. 3, No. 2, Jun. 2003.
Tharanathan, "Food-Derived Carbohydrates—Structural Complexity and Functional Diversity." Critical Reviews in Biotechnology, 22(I): 65-84 (2002).
Tharanathan, "Biodegradable Films and Composite Coatings: Past, Present and Future." Trends in Food Science & Technology 14 (2003) 71-78.
Thitipraphunkul, et al. "A Comparative Study of Edible Canna (*Canna edulis*) Starch From Different Cultivars. Part I. Chemical Composition and Physicochemical Properties." Carbohydrate Polymers 53 (2003) 317-324.
Tserki, et al. "Novel Biodegradable Composites Bassed on Treated Lignocellulosic Waste Flour as Filler. Part I. Surface Chemical Modification and Characterization of Waste Flour." Composites: Part A 36 (2005) 965-974.
Tserki, et al. "Novel Biodegradable Composites Bassed on Treated Lignocellulosic Waste Flour as Filler. Part II. Developments of Biodegradable Composites Using Treated and Compatibilized Waste Flour." Composites: Part A 37 (2006) 1231-1238.
Van Soest, et al. "Influence of Amylose-Amylopectic Ratio on Properties of Extruded Starch Plastic Sheets." Journal of Macromolecular Science, Part A: Pure and Applied Chemistry. 34:9, 1665-1689, DOI: 10.1080/10601329708010034, (1997).
Van Soest, et al. "Influence of Glycerol on the Melting of Potato Starch." Industrial Crops ADN Products 5 (1996) 1-9.
Xu, et al. "Water Solubility, Thermal Characteristics and Biodegradability of Extruded Starch Acetate Foams." Industrial Crops and Products 21 (2005) 361-368.
Zhai, et al. "Radiation Modification of Starch-Based Plastic Sheets." Carbohydrate Polymers 52 (2003) 311-317.

* cited by examiner

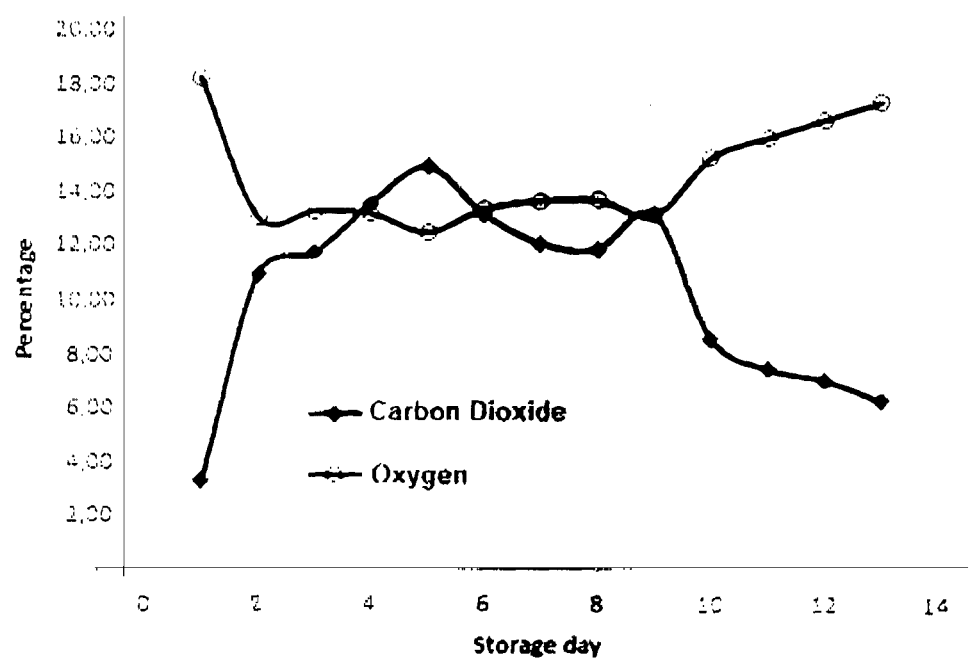

BIODEGRADABLE PACKAGING OBTAINED FROM CASSAVA FLOUR AND FIQUE FIBER AND THEIR MANUFACTURE PROCESS

RELATED APPLICATIONS

This application is the United States National Stage of International Application No. PCT/IB2012/055060, filed Sep. 23, 2012, which was published as International Publication No. WO 2013/042094, and which claims benefit of Columbian Patent Application No. 2011124719 filed Sep. 23, 2011. Both applications are incorporated by reference in their entirety herewith.

TECHNICAL FIELD

The present invention is related to novel methods to obtain compound packages of biodegradable type from cassava flour and fique fiber.

BACKGROUND ART

The main function of the packages is the preservation and protection of all types of products, with foods and raw materials the field of highest priority. These products require attention, given the contamination generated by microorganisms (bacteria, spores, fungi, etc.) during manipulation (Tharanathan, 2003). Protection is made through packages, which are generally elaborated from synthetic polymers. Nevertheless, the indiscriminate use of synthetic packages has generated serious ecological problems, contributing to the environmental contamination provoked by solid wastes of low degradability, which has driven the search for natural biopolymers. Availing of natural resources as source of conservation and recycling becomes an excellent option and innovation in the development of new biodegradable products. Its total biodegradation in products like $CO_2$, water and subsequently in compost it is a great advantage against synthetic materials (Bastioli, 2001).

Total replacement of synthetic plastics by biodegradable materials for the elaboration of packages has not been accomplished until now; nevertheless, some synthetic polymers have been substituted by other natural polymers, in specific applications. Said replacements have permitted the development of products with specific characteristics related to the barrier, mechanical, and thermal properties in certain packages like films, protectors, foams, wrappings, plates, cups, spoons, bags, etc., (Avérous and Boquillon, 2004; Wang et al., 2003).

Natural biopolymers come from four big sources: animal origin (collagen/gelatin), marine origin (chitin/chitosan), agricultural origin (lipids and fats and hydrocolloids: proteins and polysaccharides), and microbial origin (polylactic acid (PLA) and polyhydroxyalkanoates (PHA)) (Tharanathan, 2003).

Polysaccharides are known for their complex structure and functional diversity (Stawaski and Jantas, 2003). The linear structure present in the cellulose (1,4-b-D-glucan), amylose (a component of starch 1,4-a-D-glucan), and chitosan (1,4-b-D-carbohydrate polymer) provide the films hardness, flexibility, and transparency; the films are resistant to fats and oils.

Starch is an abundant raw material, specifically that coming from corn; it has thermoplastic properties when the structural disruption takes place at molecular level. The presence of amylose at 70% in amylose-corn starches gives a strong structure and more flexibility to the film. The branched structure of the amylopectin generally gives the film poor mechanical properties. Compounds from hydroxypropylated starches are used for the preservation of candies, raisins, nuts, and dates to avoid oxidative rancidity (Tharanathan, 2003). Synthesis of the copolymerization and grafting of monomers like acrylonitrile (AN) generate a precursor of acrylic fibers used in the preparation of starch compounds plus polymer (starch-graft-PAN), which are also biodegradable (Tharanathan, 2002).

Research on biodegradable plastics based on starch began since 1970 and currently continue in several laboratories throughout the world. Technologies that are still being developed, are related to the incorporation of the starch granule or starch in gelatinized form to formulations of the films manufactured during processes of compression, extrusion blowing, single or double-screw extrusion, and injection molding (Blacido et al., 2005; Parra et al., 2004). The problem presented by the films manufactured with starch is the sensitivity to humidity, which has been reduced by using in the formulations polyvinylalcohol (PVA), glycerin, sorbitol, nitrogenous bases, etc. (Shamekin et al., 2002; Smits et al., 2003; Finkenstadt and Willett, 2004; Yu, 2004; Acosta et al., 2006). Plasticization of the native starch granule or hydrolyzed starch is obtained through the structural disruption resulting from a decrease of the crystals during the extrusion process and by the action of the plasticizer, with a new type of material emerging known as thermoplastic starch (TPS) (Acosta et al., 2005; Villada, 2005). Likewise, studies have been conducted on TPS made from amylose and amylopectin; in these the barrier properties were analyzed, which showed high permeability to $O_2$ and decrease of water vapor in TPS from amylose compared to those elaborated from amylopectins (Forssell et al., 2002; Dole et al., 2004; Jansson and Thuvander, 2004; Blacido et al., 2005).

TPS is a material obtained through the structural disruption (modification) given within the starch granule when it is processed with low water content and the action of thermal and mechanical forces in the presence of plasticizers that do not evaporate easily during processing (Bastioli, 2001). TPS presents several attributes, besides its biodegradability, it is a flexible and renewable material and it can be easily adapted to different processes of thermoplasticization by using standard equipment used in the manufacture of synthetic polymers, like injection molding, extrusion blow molding, injection molding, molding by compression, extrusion of flat film, and radiation by molding (Van Soest et al., 1996b; Zhai et al., 2003).

Adding natural polymers like starch inside the polyethylene (synthetic polymer), in granular for between 6 and 30%, is another approach in the manufacture of biodegradable packaging. Films from starch and low-density polyethylene (LDPE) contain up to 30% starch, shown as a partially biodegradable material. Another application of starch is the combination in gelatinized form in proportions between 30 and 70% mixed with synthetic polymers likewise gelatinized, like the case of polyvinylalcohol in proportions varying between 10 and 20% (Muratore et al., 2005).

Different products exist in the market made of synthetic polymers and gelatinized starch commercialized by Mater-Bi® (Hanna, 2004). However, currently both types of materials cannot be considered completely biodegradable compounds (Pedroso and Rosa, 2005). Plastic bottles of starch formed from foams through mixtures of starch with polylactic acid are used as filler material that dampens and protects against blows and vibrations during transport (Peesan et al., 2005; Xu et al., 2005).

In spite of the advantages of materials derived from starch, TPS presents little stability when humidity conditions are high (Avérous and Frigant, 2001; Avérous and Boquillon, 2004; Avérous et al., 2003). One of the problems of using TPS in bioplastics is its fragile nature, relatively caused by its low vitreous transition temperature (Tg) and the lack of sub-Tg relaxation due to the starch's molecular chain (Kenshi et al., 1999; Shogren et al., 1993). Additionally, eventual migration of plasticizers into the environment increases the material's fragility (De Graaf et al., 2003). Fragility is a problem of structural stability that increases over time due to diminished free volume and the retrogression of starch (Kuakoon et al., 2003). To increase TPS flexibility, a wide variety of plasticizers have been used like sugar, polyalcohols, amino acids, lipids, sorbates and phosphates (De Graaf et al., 2003; Fama et al., 2005; Kuakoon et al., 2003; Nashed et al., 2003; Parra et al., 2004; Petersson and Standing, 2005). Some studies hold that nitrogenous compounds prevent retrogression in starch gels longer than other additives, increasing the stability of the gel (Ma and Yu, 2004; Shogren et al., 1993). However, most nitrogenous compounds are in solid state and melt at high temperatures yielding little flexibility (Avérous and Frigant, 2001). Another problem in the development of TPS is the presence of high contents of amylose, which diminishes flexibility compared to TPS made from high contents of amylopectin (Van Soest and Essers, 1997). Additionally, during storage TPSs made from native starches undergo structural changes, presenting greater fragility or rigidity depending on plasticizer content (Van Soest et al., 1996a).

To summarize, against ordinary plastic polymers, thermoplastic starch presents disadvantages like: its solubility in water, high hygroscopicity, rapid aging due to retrogression, and poor mechanical properties, which limit some applications like packaging. These problems have been reduced when incorporating in the thermoplastic matrix natural fillers like cellulosic fibers that serve as reinforcement material to improve the mechanical properties: effort and elongation, properties of vital importance in evaluating any synthetic or biodegradable plastic material, given that they permit characterizing the material and its application in the development of any package (Salgado et al., 2008). These compound materials are comprised of three phases: reinforcement providing resistance and rigidity, the matrix that is the material sought to reinforce and the interface responsible for adequate compatibility between the matrix and the reinforcement (Tserki et al., 2005), where the quality of the interface determines the final properties of the material, permitting correct fiber-matrix adhesion and ensuring transference of stress from the matrix to the fiber (Tserki et al., 2006).

In relation to the development of biodegradable packaging from starch that include the use of high molecular weight polymers (100,000 to 400,000) for the formation of the molded polymer; patent US2007/0276317 reveals a biodegradable molded polymer comprising: 50 to 85% (p/p) of starch, 4 to 13% (p/p) of a polymer soluble in water, 10 to 35% (p/p) of sorbitol and other polyols like plasticizer, 0.5 to 10% (p/p) of polyethylene oxide or PEG, 0.25 to 3% (p/p) of a food grade emulsifier with an HLB of 2 to 10 and stearic acid between 0 and 1.5% (p/p).

In the same sense, U.S. Pat. No. 6,168,857 shows sheet-type compositions based on a matrix formed by starch and an organic polymer dispersible in water that incorporates organic or inorganic fibers dispersed homogenously (pine fibers), an inorganic mineral-type filler agent (between 30 and 60%), and a plasticizer. The document points to a procedure to elaborate a sheet that comprises the stages of mixing the components previously described, pass the mixture through a set of rollers at a temperature so that the organic polymer forms a layer that reduces adhesion of the material to the roller, heat to gelatinize the starch and remove a portion of water obtaining a sheet with a thickness less than 1 cm and a density greater than 0.5 g/cm$^3$.

U.S. Pat. No. 5,939,192 refers to a thermoplastic material for use in the construction of vehicles and wooden articles like furniture, which comprises plant fiber particles distributed uniformly on a gel forming biopolymer matrix, where said fibers present a longitude between 0.05 and 35 mm and are impregnated with at least an acid resin. The formulation also includes a fat or oil, a polyol, and NaCl, where the gel forming biopolymer is selected from: starch, protein, lignin, hemicellulose, dextrin, pectin, or chitin and the fibrous material is selected from wood, cellulose, and cellulose obtained from recycled fibrous material. Additionally, it reveals a procedure to obtain the thermoplastic that comprises the stages of: (i) Heat the fibrous material at a temperature between 170 and 220° C. and add an acid resin or a mixture of said resin with an acid; (ii) prepare a mixture with the biopolymer, the fibrous material and the rest of the additives at a temperature above the room temperature and atmospheric pressure below environmental pressure until forming a gel where the fibrous material is partially impregnated; (iii) treat the mixture with a polyol; (iv) mold the mixture until forming a granulated material through extrusion free of pores at a temperature between 70 and 135° C. and pressure between 20- and 100 bar or by injection at a temperature between 110 and 210° C. and pressure between 250 and 1200 bar.

U.S. Pat. No. 7,067,651 divulges a process to prepare a biodegradable composition that comprises the stages of mixing starch, water, a plasticizer agent, a filler agent, and a compactant in the presence of alkali or salt until obtaining a uniform mixture and inject or compress this mixture in a closed mold at a temperature between 150 and 300° C. until gelatinization of the starch is reached. The composition is characterized for comprising: (i) starch at a percentage between 30 and 70% (p/p) prepared from cassava, rice, potato, corn, sorghum or sago alone or in mixtures in the native or modified form; (ii) a plasticizer agent at a percentage above 10% selected from: glycerol, sorbitol, glucose, fructose, syrup, honey, fatty acids, esters from fatty acids, monoglycerides, di-glycerides, or fosfolipids alone or in mixtures; (iii) a filler agent selected from diatomaceous earth, bentonite, cassava pulp, natural fibers alone or in mixtures at a percentage above 30%; (iv) a compactant selected from: alginate, guar gum, carrageenan, konjak, soy protein, proteins of animal and plant origin and (v) an alkali or salt selected from CaOH, NaOH, KOH, CaCO$_3$, Na$_2$CO$_3$, K$_2$CO$_3$, Na$_2$HCO$_3$, (NH$_4$)$_2$HCO$_3$ alone or in mixtures to adjust the pH of the mixture to a neutral value or slightly alkaline.

BRIEF DESCRIPTION OF DRAWINGS

FIG. 1 presents the production kinetics of CO$_2$ of guavas packed in the flexible sheets elaborated according to the aim of the invention.

BEST MODE FOR CARRYING OUT THE INVENTION

In a first aspect, the invention points to a process for the production of a compound biodegradable semi-rigid material, elaborated from cassava flour and fique fiber.

In a second aspect, the invention divulges a compound material comprising cassava flour, fique fiber, glycerin, vegetable oil, polysorbate 80, and water.

MODE FOR THE INVENTION

The present invention claims a process to produce a compound semi-rigid biodegradable-type material molded by thermo-pressing to manufacture packages for dry foods and other products, comprising the stages of:

1. Processing of cassava: The cassava is peeled, chopped, and sun dried; thereafter it is milled and packaged.
2. Milling and sieving of flour and fique fiber: Flour with humidity between 8 and 10% is milled for the second time using a hammermill and selected in a 40/60 sieve and 70/bottom to a particle size in the range comprised between 250 and 425 μm. Fique fiber is furnace dried to humidity between 8 and 11%; thereafter, it is milled in the hammermill and sieved in 40/60 to particle size in the range comprised between 250 and 425 μm.
3. Mixture: The cassava flour and fique fiber are dry mixed, then the plasticizer (glycerin) is added along with the lubricant (vegetable oil). Thereafter, polysorbate 80 is added and, finally, water in the following proportions: cassava flour between 30 and 40% p/p, fique fiber 10 to 20% p/p, glycerin 4 to 5% p/p, vegetable oil 4 to 5% p/p, polysorbate 80 0.5 to 1.5% p/p, and water between 30 and 50% p/p.
4. Molding by thermo-pressing of the mixture: The mixture obtained is molded by thermo-pressing during 2 to 5 minutes at a temperature between 180 and 220° C.

Likewise, the compound material is claimed according to the process previously described comprising: cassava flour between 30 and 40% p/p, fique fiber 10 to 20% p/p, glycerin 4 to 5% p/p, vegetable oil 4 to 5% p/p, polysorbate 80 0.5 to 1.5% p/p, and water between 30 and 50%.

The following presents a series of examples to illustrate the best way of carrying out the present aim of the invention.

EXAMPLE 1

Cassava is grown in the flat zone to the north of the Department of Cauca and after 8 to 13 months it is harvested and taken to the starch extraction plant 'rallanderia' where it is peeled, chopped, sun dried, and then milled and packed. This process was carried out at the Rallanderia La Agustina (Mondomo-Cauca). The flour is collected in the starch extraction plant and transported to the pilot plant of the Faculty of Agricultural Sciences at Universidad del Cauca, where it is milled for the second time using a hammermill (Penagos, TP8) with a 3-hp electric motor at 3600 rpm (WEG).

The fique fiber is collected from the fiber wastes in the company Empaques del Cauca. This fiber is furnace dried to humidity between 8 and 11% and then milled in a hammermill located in the pilot plant previously mentioned.

The cassava flour is sieved by using electrical sieving (TFiltros y Tamices Bolaños) and mesh sieving 40, 60, 70 and bottom. That retained in the 40/60 sieves and 70/bottom is used. The fique is sieved by using electrical sieving and that retained in the 40/60 sieves is used.

The cassava flour and fique fiber are dry mixed in a mixer (KitchenAid (Series No. WM1265378) with plane agitator model K5AB); thereafter, adding the plasticizer (glycerin), lubricant (vegetable oil), and an additive (Tween 80), and—finally—water is added. The proportion from each component is 60, 25, 7.5, 7.5 for flour, fique, glycerin, and oil. This represents 100% of the mixture. The Tween 80 and water are added in a proportion of 2 and 65% with respect to the mixture.

The mixture obtained in the previous step is molded by compression during three minutes at 200° C. in a compression-molding equipment where a tray-type mold has been installed with male and female cavities to manufacture trays with hydraulic drive and coupled to a temperature control system (EDAFA SA, La Estrella Antioquia, Colombia), and as a final product a dark beige semi-rigid biodegradable tray was obtained with a smooth surface with a thickness of 3.5±0.5 mm, which presented the mechanical characteristics consigned in Table 1.

Characterization of mechanical properties was conducted by using the following equipment: the tension test was performed on Universal Testing Equipment (Shimadzu, Model EZ Test L Package, Japan, Series No. 346-54909-21), with a crosshead speed of 1 mm/min and load cell of 500 N. Prior to the test, the samples were conditioned during 8 days to relative humidity of 50+/−5% and 23+/−2° C. (ASTM D618-08). Likewise, the flexion test was conducted with the Universal Testing Equipment, resting the samples on two supports located under their ends. Thereafter, a flexion force was applied on the center of the simple until reaching its fracture. Prior to the test, the samples were conditioned during 8 days to relative humidity of 50+/−5% and 23+/−2° C. (ASTM D618-08).

The mixture obtained in the previous step is molded by thermo-pressing during three minutes at 200° C. in a compression-molding equipment where a tray-type mold has been installed with male and female cavities to manufacture trays with hydraulic drive and coupled to a temperature control system (EDAFA SA, La Estrella Antioquia, Colombia), and as a final product a dark beige semi-rigid biodegradable tray was obtained with a smooth surface with a thickness of 3.5±0.5 mm, which presented the mechanical characteristics consigned in Table 1.

Characterization of mechanical properties was conducted by using the following equipment: the tension test was performed on Universal Testing Equipment (Shimadzu, Model EZ Test L Package, Japan, Series No. 346-54909-21), with a crosshead speed of 1 mm/min and load cell of 500 N. Prior to the test, the samples were conditioned during 8 days to relative humidity of 50+/−5% and 23+/−2° C. (ASTM D618-08). Likewise, the flexion test was conducted with the Universal Testing Equipment, resting the samples on two supports located under their ends. Thereafter, a flexion force was applied on the center of the simple until reaching its fracture. Prior to the test, the samples were conditioned during 8 days to relative humidity of 50+/−5% and 23+/−2° C. (ASTM D618-08).

The impact test was conducted on Izod-type impact testing equipment (Impact Tester TNI No. 43-1, Testing Machines Inc). The samples were perforated on the central part on one of its sides and located vertically on the equipment. Then, the pendulum was released and the fracture energy of the impacted sample was recorded. The equipment is housed in the laboratory of Mechanical Engineering at Universidad de los Andes (Bogotá-Colombia).

The climatic chamber employed to condition the samples prior to the tension and flexion tests was made by Binder (model KBF 115) and for the calibration of the sample dimensions prior to conducting the tension and flexion tests a digital caliper was used (Mitutoyo, CD-6'CSX-B, Brazil).

TABLE 1

Mechanical characteristics of the compound material
obtained according to the second aim of the invention

| TENSION | | | FLEXION | | | |
| --- | --- | --- | --- | --- | --- | --- |
| EFFORT (MPa) | YOUNG MODULUS (MPa) | DEFORMATION (%) | EFFORT (MPa) | YOUNG MODULUS (MPa) | DEFORMATION (%) | IZOD IMPACT Resistance to impact (J/m) |
| 1.2 to 2.2 | 260 to 420 | 0.3 to 0.9 | 1.8 to 3.9 | 200 to 430 | 1.0 to 1.5 | 17 to 23 |

EXAMPLE 2

Guavas were packed on the biodegradable trays obtained with the compression molding equipment (example 1), and these were covered with a 'vinipel' type flexible plastic sheet. The packed guavas were stored at room temperature (23±2° C. and 70±5% RH). Daily monitoring was conducted of the carbon dioxide production during 10 days by using gas measuring equipment (OXYBABY® Code No. OXYM1), obtaining the results shown in Table 2 and in FIG. 1.

TABLE 2

Production of $CO_2$ from guavas packed in the
flexible sheets of the invention

| Day of storage | $CO_2$ (%) | $O_2$ (%) |
| --- | --- | --- |
| 1 | 3.27 | 18.17 |
| 2 | 10.93 | 13.00 |
| 3 | 11.67 | 13.23 |
| 4 | 13.53 | 13.13 |
| 5 | 14.87 | 12.43 |
| 6 | 13.10 | 13.30 |
| 7 | 12.00 | 13.60 |
| 8 | 11.80 | 13.63 |
| 9 | 13.13 | 13.07 |
| 10 | 8.53 | 15.17 |
| 11 | 7.40 | 15.90 |
| 12 | 7.00 | 16.57 |
| 13 | 6.23 | 17.20 |

Although the present invention has been described with the preferred embodiments shown, it remains understood that the modifications and variations conserving the spirit and reach of this invention are understood within the scope of the claims attached.

The invention claimed is:

1. A process to produce a semi-rigid biodegradable-type compound material molded by thermo-pressing For the manufacture of packages of dry foods and other products, comprising the stages of:
    (a) Adjust the humidity of the cassava flour to a value between 8 and 10% and diminish its particle size to a range comprised between 250 and 425 μm.
    (b) Dry the fique fiber to humidity between 8 and 11%, and diminish its particle size to a range comprised between 250 and 425 μm.
    (c) Dry mix the cassava flour and the fique fiber and add glycerin and vegetable oil.
    (d) Add to the mixture polysorbate 80 and water in the following proportions: cassava flour between 30 and 40% wt./wt., fique fiber 10 to 20% wt./wt., glycerin 4 to 5% wt./wt., vegetable oil 4 to 5% wt./wt., polysorbate 80 0.5 to 1.5% wt./wt., and water between 30 and 50% wt./wt.
    (d) Mold the mixture obtained by thermo-pressing during 2 to 5 minutes at a temperature between 180 and 220° C.

2. A compound material obtained through the procedure from claim 1 comprising: cassava flour between 30 and 40% wt./wt., fique fiber 10 to 20% wt./wt., glycerin 4 to 5% wt./wt., vegetable oil 4 to 5% wt./wt., polysorbate 80 0.5 to 1.5% wt./wt., and water between 30 and 50% wt./wt.

* * * * *